United States Patent
Ausserre et al.

(10) Patent No.: US 10,189,019 B2
(45) Date of Patent: Jan. 29, 2019

(54) ELECTROCHEMICAL DEVICE AND APPARATUS AND METHODS IMPLEMENTING SUCH AN APPARATUS

(71) Applicants: CENTRE NATIONAL DE LA RECHERCHE SCIENTIFIQUE, Paris (FR); UNIVERSITE DU MAINE, Le Mans (FR)

(72) Inventors: Dominique Ausserre, Soulitre (FR); Refahi Abou Khachfe, Barja el Chouf (LB); Guillaume Brotons, Le Mans (FR)

(73) Assignees: CENTRE NATIONAL DE LA RECHERCHE SCIENTIFIQUE, Paris (FR); UNIVERSITE DU MAINE, Le Mans (FR)

( * ) Notice: Subject to any disclaimer, the term of this patent is extended or adjusted under 35 U.S.C. 154(b) by 21 days.

(21) Appl. No.: 15/118,379

(22) PCT Filed: Feb. 16, 2015

(86) PCT No.: PCT/EP2015/053181
§ 371 (c)(1),
(2) Date: Aug. 11, 2016

(87) PCT Pub. No.: WO2015/121462
PCT Pub. Date: Aug. 20, 2015

(65) Prior Publication Data
US 2017/0173577 A1 Jun. 22, 2017

(30) Foreign Application Priority Data
Feb. 17, 2014 (FR) .................................... 14 51233

(51) Int. Cl.
*H01M 4/06* (2006.01)
*B01L 3/00* (2006.01)
(Continued)

(52) U.S. Cl.
CPC ................. *B01L 3/50* (2013.01); *B01L 99/00* (2013.01); *H01M 4/06* (2013.01); *H01M 4/366* (2013.01);
(Continued)

(58) Field of Classification Search
None
See application file for complete search history.

(56) References Cited

U.S. PATENT DOCUMENTS

| 5,216,542 A | 6/1993 | Szczyrbowski et al. |
| 2011/0199610 A1 | 8/2011 | Myrick et al. |

FOREIGN PATENT DOCUMENTS

WO 2009/037311 A1 3/2009

OTHER PUBLICATIONS

H. Cachet et al., "In situ Investigation of Crystallization Processes by Coupling of Electrochemical and Optical Measurements: Application to CaCO[sub 3] Deposit," Electrochemical and Solid-State Letters, vol. 4, No. 4, Jan. 2001, pp. C23, XP055182131.
(Continued)

*Primary Examiner* — Wyatt P McConnell
(74) *Attorney, Agent, or Firm* — Baker & Hostetler LLP

(57) ABSTRACT

An electrochemical device comprises a fluidic cell having an internal volume able to be filled with a fluid and at least one first and one second electrode making contact with the internal volume, wherein at least the first electrode comprises a thin layer made of a conductive material that is optically absorbent at at least one wavelength $\lambda$ in the visible, near-infrared or near-ultraviolet spectrum, the thin layer being arranged on or in an internal surface of a wall of the fluidic cell which is at least partially transparent to said wavelength $\lambda$. An electrochemical apparatus comprises such an electrochemical device and an optical microscope arranged to illuminate the first electrode through the wall at (Continued)

at least said wavelength λ and also to observe it through the wall.

19 Claims, 2 Drawing Sheets

(51) Int. Cl.
  *B01L 99/00* (2010.01)
  *H01M 4/36* (2006.01)
  *H01M 4/02* (2006.01)

(52) U.S. Cl.
  CPC .......... *B01L 2300/0645* (2013.01); *B01L 2300/0654* (2013.01); *B01L 2300/168* (2013.01); *H01M 2004/021* (2013.01)

(56) References Cited

OTHER PUBLICATIONS

M. Nobial et al., "In Situ Investigation of Crystallization Processes of ZnO by Coupling of Electrochemical and Optical Measurements," Proceedings of the International Workshop "Advanced Techniques for Energy Sources Investigation and Testing," Jan. 2004, pp. P11-1-P11-6, XP055182116.

O. Devos et al., "Simultaneous EIS and in situ microscope observation on a partially blocked electrode application to scale electrodeposition," Electrochimica Acta, vol. 51, No. 8-9, Jan. 20, 2006, pp. 1413-1422, XP028027753.

Y. Gorlin et al., "In Situ X-ray Absorption Spectroscopy Investigation of a Bifunctional Manganese Oxide Catalyst with High Activity for Electrochemical Water Oxidation and Oxygen Reduction," Journal of the American Chemical Society, vol. 135, No. 23, 2013, pp. 8525-8534.

S. G. Moiseev et al., "Design of Antireflection Composite Coating Based on Metal Nanoparticles," Physics of Wave Phenomena, vol. 19, No. 1, pp. 47-51.

R. M. A. Azzam et al., "Antieflection of an absorbing substrate by an absorbing thin film at normal incidence," Applied Optics, vol. 26, No. 4, Feb. 15, 1987, pp. 719-722.

M. A. Kats et al., "Nanometre optical coatings based on strong interference effects in higly absorbing media," Nature Materials, vol. 12, Jan. 2013, pp. 20-24.

ELECTROCHEMICAL DEVICE AND APPARATUS AND METHODS IMPLEMENTING SUCH AN APPARATUS

CROSS-REFERENCE TO RELATED APPLICATIONS

This application is a National Stage of International patent application PCT/EP2015/053181, filed on Feb. 16, 2015, which claims priority to foreign French patent application No. FR 1451233, filed on Feb. 17, 2014, the disclosures of which are incorporated by reference in their entirety.

FIELD OF THE INVENTION

The invention relates to an electrochemical device, to an apparatus comprising such a device and to the use of such an apparatus to study in situ at least one electrochemical reaction and/or an electrochemical deposition process.

BACKGROUND

Solid-liquid interfaces are the site of many types of chemical and physico-chemical reactions. In particular, the interfaces between conductive solids (especially metals) and electrolytes are the site of electrochemical reactions that have many possible applications: generation and storage of electrical power, production of chemical and biochemical sensors, catalysis, etc.

These reactions are complex phenomena, involving a number of steps, which are particularly difficult to understand and control. Because of this complexity, studies carried out in this field mainly focus on planar surfaces; likewise, planar surfaces are preponderantly used in practical applications. With the gradual integration of complex analytical devices, it is increasingly important to take into account the local character of electrochemical phenomena. Furthermore, the study in real time of reaction kinetics provides essential information on these mechanisms. For these reasons there is an increasing need for tools combining local electrochemical measurements and imaging. The simplest imaging techniques are optical techniques; unfortunately, it is difficult to combine them with local electrochemical measurements. Specifically, electrochemical reactions occur on the surface of electrodes, which are generally opaque, making contact with an electrolyte; therefore, in accordance with the prior art, an optical imaging device used to study such a reaction must be arranged in the half-space containing the active surface of the electrode and the electrolyte. However, the local electrochemical measurements must also be carried out in the same half-space, for example by means of a scanning contact probe that scans the electrode; such a probe may get between the optical imaging device and the surface, hindering observation of the latter.

Even in the absence of these blocking constraints, the observation of a surface through an electrolyte may prove to be difficult. Moreover, the modifications of the surface of the electrode that are induced by an electrochemical reaction often have a low optical contrast—think for example of the very first stages of deposition of an electrolytic layer, when said layer has an average thickness of about one nanometer or less.

SUMMARY OF THE INVENTION

The invention aims to completely or partially overcome these drawbacks of the prior art.

According to the invention, such an aim is achieved using a thin conductive layer deposited on the internal side of a transparent wall of an electrochemical cell. This thin conductive layer performs a dual function:

it constitutes a working electrode, on the surface of which the electrochemical reaction to be studied takes place;

it also constitutes an optical-contrast-amplifying layer optimized for illumination and observation via its back side (opposite the side making contact with the electrolyte contained in the electrochemical cell).

Thus, the electrode may be observed with a high contrast via its back side, and hence observation is not hindered by the simultaneous presence of a scanning electrochemical characterization means on the front side.

The invention also aims to provide a new method for manufacturing thin structured layers, implementing a photo-electrochemical printing process. According to this aspect of the invention, a light pattern may be projected onto the back side of a thin conductive layer such as mentioned above. Under suitable chemical conditions (see for example document WO 2009/037311), deposition occurs selectively only in illuminated (or, conversely, non-illuminated) regions, or in any case with a deposition growth rate dependent on light intensity. Thus a structured thin layer is obtained the structure of which reproduces that of the projected optical pattern. The growth of this layer may be followed in real time, and with a high optical contrast, by observation from the back side of the thin layer.

One subject of the invention is therefore an electrochemical device comprising a fluidic cell having an internal volume able to be filled with a fluid and at least one first and one second electrode making contact with said internal volume, characterized in that at least said first electrode comprises a thin layer made of a conductive material that is optically absorbent at at least one wavelength $\lambda$ in the visible, near-infrared or near-ultraviolet spectrum, said thin layer being arranged on or in an internal surface of a wall of said fluidic cell which is at least partially transparent to said wavelength $\lambda$.

According to various embodiments of such a device:

Said thin layer may have a thickness smaller than or equal to 150 nm, preferably smaller than or equal to 40 nm and more preferably smaller than or equal to 20 nm.

Said wall may form, with said thin layer, a window having, at said wavelength $\lambda$, a transmittance higher than or equal to 30%, preferably higher than or equal to 60% and more preferably higher than or equal to 80%.

This window may have a reflectance lower than or equal to 70%, preferably lower than or equal to 50%, more preferably lower than or equal to 40%, even more preferably lower than or equal to 20% and even more preferably lower than or equal to 10% or even 1%.

Said thin layer may be produced from a material chosen from: a metal; a semiconductor; graphene; boron-doped diamond; a layer of nanoparticles; a metal oxide; a conductive polymer.

Said thin layer may be produced by implantation—and especially by ion implantation—in said wall.

At least the portion of said wall making direct contact with said thin layer may be made of a conductive material that is transparent at said wavelength $\lambda$.

The device may comprise a scanning probe microscopy probe a conductive tip of which constitutes said second electrode.

Alternatively, said second electrode may have a planar surface arranged facing said thin layer parallelly to the latter.

Said wall bearing said thin layer may be removable.

The device may also comprise a third electrode that is what is called a reference electrode, making contact with said internal volume.

Another subject of the invention is an electrochemical apparatus comprising such an electrochemical device and an optical device for imaging in reflection, which is arranged to illuminate said thin layer through said wall at at least said wavelength λ and also to observe it through said wall.

According to various embodiments of such an apparatus:

Said optical device or imaging in reflection may comprise an optical microscope.

The apparatus may also comprise a scanning probe microscope having a scanning probe arranged to scan said thin layer, a conductive tip of which forms said second electrode.

The apparatus may also comprise a potentiostat or galvanostat connected to said electrodes.

Said internal volume may contain a fluid that is at least partially transparent at said wavelength λ, the thickness $e_1$ of said thin layer being comprised between half and twice a thickness corresponding to a first reflectivity minimum when said layer is illuminated at said wavelength λ through said wall.

Said optical device for imaging in reflection may furthermore be suitable for illuminating said thin layer at at least one wavelength λ minimizing reflectivity in correspondence with said first minimum, with a tolerance of plus or minus 10% and preferably of plus or minus 5%.

The apparatus may also comprise an optical projecting device arranged to project a light pattern onto said thin layer through said wall.

Yet another subject of the invention is a method for studying an electrochemical reaction in situ, comprising the following steps:

applying a potential difference between two electrodes of such an electrochemical apparatus, a fluid capable of initiating an electrochemical reaction being contained in said internal volume, and thereby causing a said electrochemical reaction to occur on the surface of said first electrode; and illuminating and observing said first electrode through said wall by means of said optical imaging device.

Yet another subject of the invention is an electrochemical printing process comprising the following steps:

applying a potential difference between said first and said second electrode of such an electrochemical apparatus, a fluid capable of initiating a photo-electrochemical deposition reaction being contained in said internal volume;

simultaneously, projecting a light pattern onto said thin layer through said wall by means of said optical projecting device and thereby causing a photo-electrochemical deposition reaction to occur on the surface of said first electrode, which reaction is controlled by the local illumination of said surface by said light pattern; and observing said first electrode through said wall by means of said optical imaging device.

Advantageously, said optical projecting device may be used to project onto said thin layer a light pattern corresponding to a first wavelength or to a first set of wavelengths and said optical imaging device may be used to illuminate said thin layer at at least said wavelength λ, which wavelength is different from said first wavelength or does not belong to said first set of wavelengths.

BRIEF DESCRIPTION OF THE DRAWINGS

Other features, details and advantages of the invention will become apparent on reading the description given with reference to the appended drawings, which are given by way of example and show, respectively.

DETAILED DESCRIPTION

Figure 1:
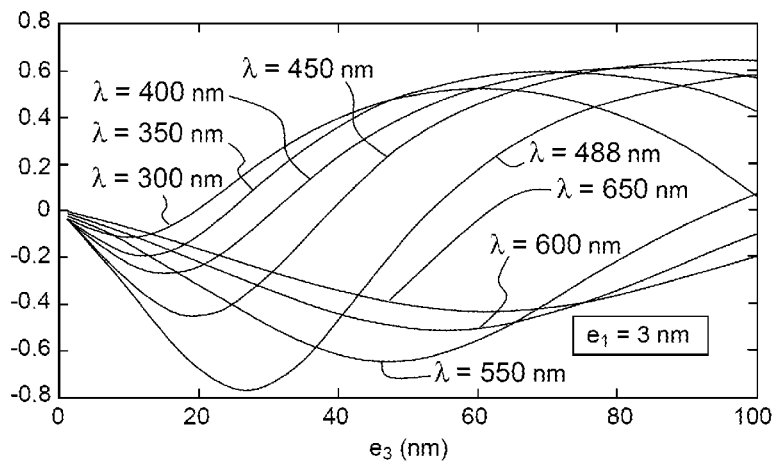
FIG. 1, the contrast with which a sample deposited on an absorbent contrast-amplifying layer is observed at various wavelengths.

The use of antireflection layers (or "λ/4" layers) to increase the optical contrast of an object observed in reflection by optical microscopy is a very powerful technique that has been known about for many years; it especially allowed molecular steps to be observed for the first time by Langmuir and Blodgett in 1937 and, more recently, graphene layers to be viewed by Novoselov et al.

If I is the light intensity reflected by the object to be observed, the object being deposited on a carrier, and $I_S$ the light intensity reflected by the carrier alone, then the contrast with which the sample is observed is $C=(I-I_S)/(I+I_S)$. It will be understood that the maximum absolute value of this contrast (equal to 1) is obtained when $I_S=0$, i.e. when the carrier has a zero reflectivity, or indeed when the object carried has a zero reflectivity. In the simplest case, the condition $I_S=0$ is met by using, by way of carrier, a transparent substrate on which is deposited a thin layer, which is also transparent and the thickness and refractive index of which are suitably chosen. In the case of a single antireflection layer, illuminated at normal incidence with an incident medium (from which the illumination originates) and an emergent medium (the substrate) that are transparent and semi-infinite, the following conditions are obtained:

$$n_1^2 = n_0 n_3 \tag{1a}$$

$$n_1 e_1 = \lambda/4 \tag{1b}$$

where $n_1$ is the (real) refractive index of the layer, $n_0$ and $n_3$ are the (also real) refractive indices of the incident and emergent media, $e_1$ is the thickness of the layer and λ the illumination wavelength.

Certain authors have also envisioned the use of absorbent materials to produce antireflection or contrast-amplifying layers.

For example

The article by S. G. Moiseev and S. V. Vinogradov "Design of Antireflection Composite Coating Based on Metal Nanoparticle", Physics of Wave Phenomena, 2011, Vol. 10, No. 1, pages 47-51 studies the conditions that a weakly absorbent thin layer deposited on a transparent substrate must meet to cancel reflection at normal incidence at an air-substrate interface, the illumination being from the air side. This document also describes a thin absorbent composite layer containing metal nanoparticles almost meeting these conditions. This study is based on an analytical study limited to very weakly absorbing materials and is not readily generalizable.

The following articles:

M. A. Kats et al. "Nanometre optical coatings based on strong interference effects in higly absorbing media", Nature Materials, Vol. 12, January 2013, pages 20-24; and R. M. A. Azzam et al. "Antieflection of an absorbing substrate by an absorbing thin film at normal incidence", Applied Optics, Vol. 26, No. 4, pages 719-722 (1987)

disclose absorbent antireflection layers deposited on substrates that in turn are absorbent. Here again, only particular cases are described, which are not readily generalizable.

Document U.S. Pat. No. 5,216,542 discloses an antireflection coating for a glass substrate including, on a front side of the substrate (which side is intended to be illuminated), a multilayer structure comprising transparent layers and absorbent layers made of $TiN_x$ and, on a back side of said substrate, a single absorbent layer made of $TiN_x$ the thickness of which is of a nature to ensure a low reflectivity.

One idea on which the present invention is based consists in producing an absorbent and conductive antireflection layer (although most conductive materials absorb light, the reverse is not true) deposited on a transparent substrate and dimensioned to serve as a contrast-amplifying layer when it is used in an "inverted" or "back-side" configuration, i.e. with illumination and observation through said substrate, the latter having a refractive index higher than that of the emergent medium (or "ambient medium").

Another idea on which the present invention is based consists in using such an absorbent and conductive antireflection layer by way of the working electrode of an electrochemical cell, of which said transparent substrate forms one wall. The modifications of the absorbent and conductive antireflection layer that are induced by the electrochemical reactions that take place on its surface induce substantial modifications in its reflectivity when it is illuminated and observed through the substrate, therefore allowing the progress of said reactions to be followed using an optical apparatus such as a microscope.

Given that the conductive layer serving as working electrode is observed via its back side (i.e. the side making contact with the transparent wall), electrochemical imaging techniques using a conductive scanning probe (scanning electrochemical microscopy (SECM), electrochemical scanning tunnel microscopy (ECSTM), etc.) may be implemented simultaneously without disrupting said observation.

Consider a layer made of an absorbent material of thickness $e_1$ having a complex dielectric constant $\varepsilon_1 = \varepsilon_1' - j\varepsilon_1''$, comprised between two transparent semi-infinite media, called the "incident medium" and the "emergent medium", having real dielectric constants $\varepsilon_0$ and $\varepsilon_2$, respectively. A planar light wave of wavelength $\lambda$ is incident on the layer from the incident medium. This wavelength $\lambda$ is considered to belong to the visible (390 nm-750 nm), near-infrared (750-3000 nm) or near-ultraviolet (300-390 nm) spectrum. The dielectric-constant values are to be understood as those at the wavelength $\lambda$. No real material is perfectly transparent and therefore any dielectric constant has a nonzero imaginary component; however, a dielectric constant is conventionally considered to be "real", corresponding to a "transparent" material, when the imaginary part of its refractive index at this wavelength is lower than $10^{-4}$ or even than $10^{-6}$. It will be recalled that, in the case of non-magnetic materials, the—optionally complex—refractive index is given by the square root of the dielectric constant.

Advantageously, the imaginary part $\varepsilon_1''$ of the dielectric constant of the thin absorbent layer may be higher than or equal to $10^{-4}$, or even than $10^{-3}$, or even than $10^{-2}$.

Under these conditions the reflection of the planar electromagnetic wave cancels out when $$\varepsilon_1' = \sqrt{\varepsilon_0 \varepsilon_2} \qquad (2)$$

and $$e_1 = \frac{\lambda}{2\pi} \frac{(\sqrt{\varepsilon_0} - \sqrt{\varepsilon_2})}{\varepsilon_1''} \qquad (3)$$

Equation (2) reduces to the well-known condition $n_1^2 = n_0 n_2$, valid for transparent antireflection layers, when $\varepsilon''$ tends toward 0 and in the case of non-magnetic materials.

A simple inspection of equation (3) allows some very important points to be noted:

Firstly, the fact that the refractive index $n_0 = \sqrt{\varepsilon_0}$ of the incident medium must be higher than that $n_2 = \sqrt{\varepsilon_2}$, as otherwise the thickness $e_1$ would be negative. The absorbance of the thin layer therefore introduces an asymmetry into the system.

Secondly, in the case of a highly absorbent material such as a metal, the thickness $e_1$ is very small, of about 1 nm. This is not surprising because the suppression of the reflection results from destructive interference between the amplitudes of the light reflected by the front and back sides of the thin layer; if the latter is too thick, the light incident on one side would be completely absorbed before reaching the opposite side, and this interference effect would not occur.

It is difficult to find a material meeting condition (2) because normally $\varepsilon_1'$ is negative. However, even if this condition is not met, the reflectivity is minimized when condition (3) is. A suitable choice of the wavelength may possibly allow condition (2) to almost be met.

By way of example, let us consider the case of a layer of gold deposited on a glass substrate (incident medium) making contact with an aqueous medium (emergent medium), the assembly being illuminated at a wavelength $\lambda$ through the incident medium. For $\lambda=488$ nm, $\varepsilon_0=2.31$, $\varepsilon_1'=-1.8$, $\varepsilon_1''=4.32$ and $\varepsilon_2=1.77$. A thickness $e_1=3$ nm is chosen, this being reasonably close to the ideal value—of 2.5 nm—calculated using equation (3) for $\lambda=488$ nm. Next, an object consisting of a small disc of dielectric material with a refractive index $n_3=1.46$ ($\varepsilon_3=1.208$) is deposited on the thin gold layer. FIG. 1 shows the contrast with which this object is observed, as a function of its thickness $e_3$, and for a plurality of illumination wavelengths: 300 nm, 350 nm, 400 nm, 450 nm, 488 nm, 550 nm, 600 nm, 650 nm. It may be verified that, in the case $\lambda=488$ nm, for thicknesses $e_3$ smaller than 20 nm, the contrast is negative (dark object on a light background) and its absolute value increases by about 4% for each additional nanometer of thickness. Given that a contrast of one part in 10,000 (0.01%) remains easily observable, it will be understood that the absorbent antireflection layer allows objects of average thickness smaller than 10 pm to be observed (such an "object" consists of sparse molecules on the surface of the absorbent antireflection layer). FIG. 1 shows that the wavelength $\lambda=488$ nm optimizes the contrast, but that observation is possible, with a satisfactory contrast, at other wavelengths.

If the incident medium or the emergent medium are composite media (for example if the incident medium is a multilayer structure), the dielectric constants $\varepsilon_0$ and $\varepsilon_2$ may be effective dielectric constants. If the incident medium and/or the emergent medium are partially absorbent, it is necessary to replace $\varepsilon_0$ and $\varepsilon_2$ with the real parts of their complex dielectric constants. If magnetic materials are considered, it is necessary to consider refractive indices instead of dielectric constants.

Generally, a very thin layer of an absorbent material forms an antireflection layer when it is deposited on a transparent or semi-transparent substrate, illuminated through the substrate and placed in contact with a transparent, semitransparent or even turbid emergent medium. Such a layer may cancel the reflection or exhibit a nonzero reflectivity minimum. In any case, it allows high-contrast optical images to be formed of objects that are possibly very thin and transparent, such as molecular layers (a "contrast-amplifying layer" is spoken of). In practice, for a given illumination wavelength and given incident and emergent media, it is possible to determine—by means of an analytic model or a numerical calculation—the first reflectivity minimum (i.e. the minimum at the smallest thickness, minimizing the reflectivity). The thickness of the layer will possibly coincide with this minimum or intentionally differ therefrom as will be explained below. More advantageously, the reflectivity will possibly be minimized depending on the thickness $e_1$ and on the wavelength $\lambda$, this possibly being achieved by well-known numerical techniques. Alternatively, it is possible to proceed on the basis of equation (2) by choosing an illumination wavelength $\lambda$ that minimizes $(\epsilon'_1 - \sqrt{\epsilon_0 \epsilon_2})^2$, and then applying equation (3) to determine $e_1$.

When such a thin layer is made of a conductive material such as a metal, such a configuration proves to be very highly suitable for electrochemical applications, such as will be explained with reference to FIG. 2A.

This figure, which is not to scale, illustrates a device and an apparatus according to one embodiment of the invention. The device comprises a fluidic and optionally microfluidic cell CF with two ports P1, P2 allowing a fluid EL, which may especially be an electrolyte, to be introduced and removed—optionally continuously in the form of a flow. Below, the case where the fluid EL is a transparent liquid will be considered; it may however be a partially absorbent or even turbid liquid or even a gas. The cell CF may be completely closed or partially open, for example it may be open topped.

The bottom of the cell is formed by a transparent wall PT, which is typically made of glass, on the interior side of which (i.e. on the side making contact with the liquid) a thin metal layer CMM is deposited. The wall PT may also be semitransparent; advantageously, this wall and the thin layer CMM form a window of transmittance higher than or equal to 30%, preferably higher than or equal to 60% and more preferably higher than or equal to 80%.

Advantageously, the wall PT and the thin layer CMM may constitute or form part of a removable assembly that is intended to be replaced after having been used to study an electrochemical reaction or after a photo-electrochemical printing operation. It is then a "consumable" of the apparatus in FIG. 2A.

The wall PT preferably has a thickness smaller than or equal to 1 mm or even smaller than or equal to 250 µm.

Figure 2B:
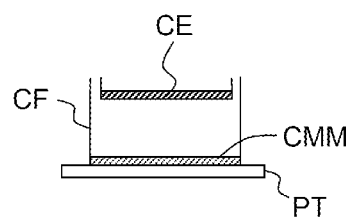
FIG. 2B, a detailed view of a fluidic cell of a device according to another embodiment of the invention.

The thickness of the layer CMM is chosen, depending on the refractive indices of the fluid EL and of the wall PT, so as to decrease the reflectivity of the window relative to the case where no layer is present. For example, equation (3) may be at least almost satisfied for a wavelength $\lambda$ in the visible, near-infrared or near-ultraviolet spectrum. In this case, whatever the fluid EL:

$$e_1 \leq \frac{\lambda}{2\pi} \frac{\sqrt{\epsilon_0}}{\epsilon''_1}$$

this corresponding to the limiting case $\epsilon_2 = 0$. Furthermore, in this case, the refractive index of the wall PT must be higher than that of the fluid EL. The thin metal layer CMM constitutes the working electrode of an electrochemical cell formed inside the fluidic cell CF; this electrochemical cell comprises at least one second electrode (counter electrode) and preferably a third electrode (reference electrode). In the embodiment in FIG. 2A, the counter electrode CE consists of the conductive tip of a scanning probe SLC of a scanning probe microscope MSL—such as an atomic force or tunnel-effect microscope—that scans the surface of the layer CMM, in accordance with the principles of scanning electrochemical microscopy. As a variant (FIG. 2B) it could be a question of a planar electrode for example fastened to an upper wall of the fluidic cell, facing the working electrode CMM. The reference electrode ER takes, in this embodiment, the form of a needle submerged in the fluid EL; in other embodiments it could, for example, be a disc integrated into the wall PT but isolated from the electrode CMM. The scanning probe microscope MSL moves the probe SLC over the surface of the layer CMM; a potentiostat PS (which in the embodiment in FIG. 2 is integrated into the microscope MSL) or a galvanostat maintains said probe at a potential $V_1$, said layer at a potential $V_2$ and the reference electrode at a potential $V_R$ and measures the current flowing between said probe and said layer. Typically, in a way known per se, the potential of the reference electrode ER and of the counter electrode CE is set and the current between said counter electrode and the working electrode CMM is measured, but other ways of proceeding are envisionable.

An optical device for imaging in reflection, such as an optical microscope MO, is arranged on the exterior side of the transparent wall PT in order to acquire an optical image of the electrochemical reactions taking place on the metal layer CMM serving as the working electrode. Specifically, these reactions modify said layer, or the composition of the electrolyte EL in its vicinity, whether this be by corrosion, by electrochemical deposition or by other redox reactions; these degradations, even when they are minimal, are seen with a high contrast by virtue of the optical properties of the layer CMM, which were discussed above. In this respect, it may be advantageous to choose a thickness for the layer CMM that is intentionally different from the reflectivity minimum so as to obtain an almost linear variation in reflectivity with thickness. For example, the thickness of the layer may correspond to the "nominal" thickness minimizing the reflectivity with a tolerance of ±10% or even ±30%, or even ±50%, or even be comprised between half and twice this nominal thickness.

Figure 2A:
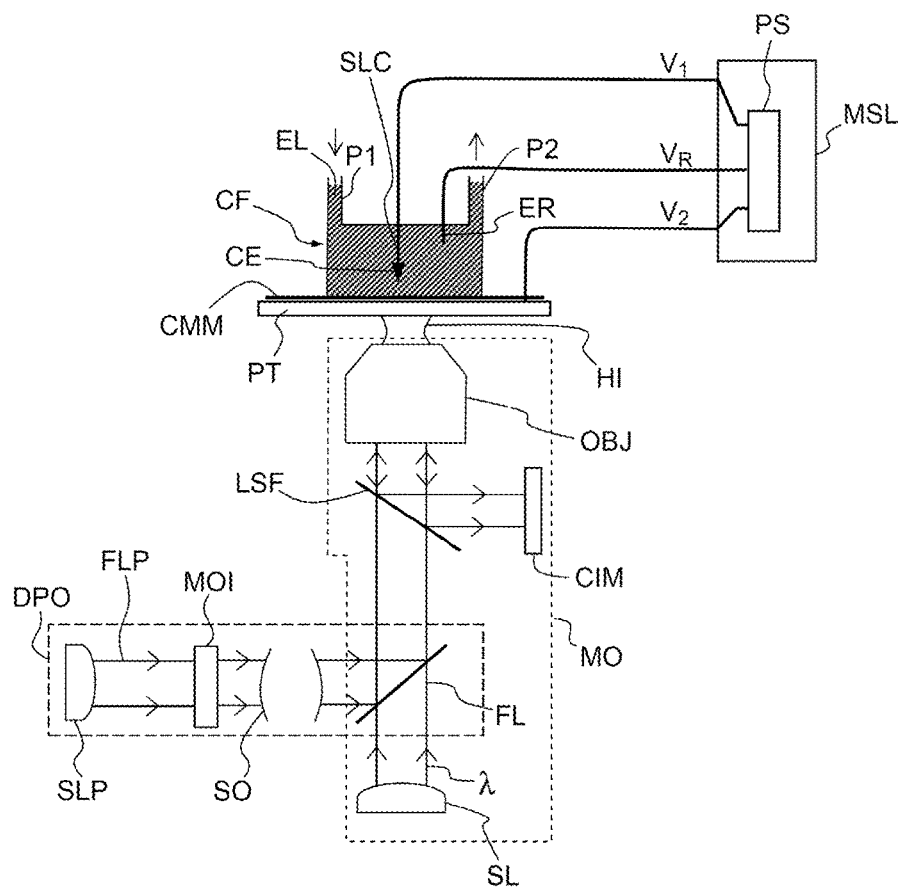
FIG. 2A, a device and an apparatus according to one embodiment of the invention.

In the example in FIG. 2A, the microscope MO comprises a light source SL generating a light beam FL, an objective OBJ focusing this beam on the back side of the layer CMM and collecting light backscattered by the latter, a beam splitter LSF for splitting the light directed toward the layer CMM and that coming therefrom and an image sensor CIM. The light of the beam FL may be monochromatic or polychromatic, spatially coherent or incoherent, polarized or unpolarized.

The layer CMM may optionally be functionalized, for example in order to produce an electrochemical sensor, such as a glucose sensor. In this case, it is recommandable to take into account the presence of the functionalizing layer when choosing the thickness of the layer CMM and optionally the illumination and observation wavelength $\lambda$, this possibly, as was indicated above, being achieved numerically using the general theory of thin optical layers.

The apparatus in FIG. 2A may be used to study an electrochemical reaction in situ. For example, it may allow the electrical currents flowing through the electrodes under the applied voltage conditions to be correlated to modifications in the weight of the layer CMM or its surroundings, which modifications are estimated on the basis of optical observations in reflection. This especially allows the quality or the progress of an electrochemical process, for example a surface treatment, an etch, a deposition, etc. to be controlled and/or the rate thereof to be measured. It is also possible to automatically control such a process by modifying the values of the voltage on the electrodes depending on the optical observation.

Figure 3A:
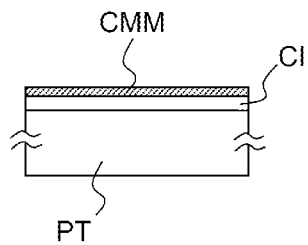
FIGS. 3A and 3B, two possible embodiments of an absorbent contrast-amplifying layer.

Intermediate layers may be present between the wall PT and the thin metal layer CMM. For example, as illustrated in FIG. 3A, which is not to scale, provision may be made for a relatively thick (about 200 nm thick for example) intermediate layer CI made of a transparent conductive material, this layer allowing the uniformity of the electrical voltage of the layer CMM to be increased; specifically, because of its small thickness, the latter has a quite high electrical resistance per unit area, leading to a nonuniform voltage when a current passes therethrough. Here too, it will be necessary to take into account the possible presence of one or more intermediate layers when dimensioning the thin metal layer CMM.

Figure 3B:
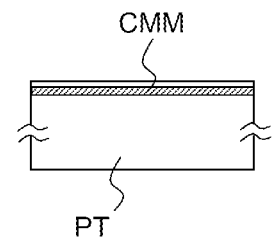

FIG. 3B illustrates another variant embodiment of the invention, in which the layer CMM is implanted (for example by ion implantation) in the wall PT, and is thus located a few nanometers below the surface of the latter. The embodiments in FIGS. 3A and 3B may be combined by implanting an absorbent and conductive layer in a thicker layer made of a transparent conductive material, the latter layer being deposited on a wall that is for example made of glass.

Up to now, only the case of a metal layer CMM has been considered. This constraint may however be relaxed, and the metal replaced by any other absorbent conductor suitable for electrochemical applications, for example graphene or a highly doped (degenerate) semiconductor, especially boron-doped diamond. The latter material in particular has advantageous properties in terms of chemical inertia, hardness and conductivity, and a very good surface finish. It may also be a question of a layer of nanoparticles, a layer of a metal oxide or one made of a conductive polymer.

The optical microscope MO may be of a different type from that illustrated in FIG. 2A. For example, it may comprise a polarizer and an analyzer that are crossed, or more generally orientable, so as to allow observations to be made with polarized light. It may also be a question of a differential interference contrast microscope including two Wollaston prisms and a crossed polarizer and analyzer.

The apparatus in FIG. 2A also comprises an optical projecting device DPO arranged to project a light pattern on said thin layer through said wall. This device comprises a second light source SLP for generating a projection light beam, a mask or optical intensity modulator MOI arranged on the path of said projection light beam in order to define said light pattern and an optical system SO forming with the objective OBJ an afocal system. A second beam splitter LSFP allows the projection light beam to be superposed on the illumination light beam FL upstream of the objective OBJ.

Advantageously, the projection light beam has a wavelength (or wavelengths) different from that or those used to observe the layer. It is not important for the reflectivity reduction condition to be met for the one or more wavelengths used for the projection of the light pattern.

As explained above, the illumination by the light pattern allows the electrochemical reactivity of the surface of the electrode CMM to be spatially modulated. This may be exploited to create patterned thin layers that are covalently grafted onto or absorbed on said electrode, the wall PT serving as a substrate. To do this a counter electrode that is planar and parallel to the layer CMM (see FIG. 2B) may possibly be used or, in contrast, a tip scanning said layer. In the second case, patterning is obtained both electrically and optically.

The structured layer attached to the surface of the electrode CMM may have chemical, electrical and/or optical properties that are different from those of said electrode. By repeating steps of optically controlled electrochemical growth it is possible to construct three-dimensional structures in stages, these structures for example performing electronic functions in microelectronic applications.

Simultaneous observation through the wall, by means of the microscope MO, allows this process to be monitored or even automatically controlled.

The invention claimed is:

1. An electrochemical device comprising a fluidic cell having an internal volume able to be filled with a fluid and at least one first and one second electrode making contact with said internal volume, wherein at least said first electrode comprises a layer made of a conductive material that is optically absorbent at at least one wavelength λ in the visible, near-infrared or near-ultraviolet spectrum, said layer being arranged on or in an internal surface of a wall of said fluidic cell which is at least partially transparent to said wavelength λ, the electrochemical device further comprising an optical device for imaging in reflection, which is arranged to illuminate said layer through said wall at at least said wavelength λ and also to observe it through said wall, —wherein said wall forms, with said layer, a window having, a transmittance higher than or equal to 30% when illuminated, at said wavelength λ, by said optical device.

2. The electrochemical device of claim 1, wherein said layer has a thickness smaller than or equal to 150 nm.

3. The electrochemical device of claim 1, wherein said wall forms, with said layer, the window having, at said wavelength λ, a transmittance higher than or equal to 60%.

4. The electrochemical device of claim 1, wherein said layer is produced from a material chosen from:
   a metal;
   a semiconductor;
   graphene;
   boron-doped diamond;
   a layer of nanoparticles;
   a metal oxide;
   a conductive polymer.

5. The electrochemical device of claim 1, wherein said layer is produced by implantation in said wall.

6. The electrochemical device of claim 1, wherein at least the portion of said wall making direct contact with said layer is produced from a conductive material that is transparent at said wavelength λ.

7. The electrochemical device of claim 1, comprising a scanning probe microscopy probe a conductive tip of which constitutes said second electrode.

8. The electrochemical device of claim 1, wherein said second electrode has a planar surface arranged facing said layer parallelly to the latter.

9. The electrochemical device of claim 1, wherein said wall bearing said layer is removable.

10. The electrochemical device of claim 1, also comprising a third electrode that is what is called a reference electrode, making contact with said internal volume.

11. The electrochemical device of claim 1, wherein said optical device for imaging in reflection comprises an optical microscope.

12. The electrochemical device of claim 1, also comprising a scanning probe microscope having a scanning probe arranged to scan said layer, a conductive tip of which forms said second electrode.

13. The electrochemical device of claim 1, also comprising a potentiostat or galvanostat connected to said electrodes.

14. The electrochemical apparatus device of claim 1, wherein said internal volume contains a fluid that is at least partially transparent at said wavelength $\lambda$, the thickness $e_1$ of said layer being comprised between half and twice a thickness corresponding to a first reflectivity minimum when said layer is illuminated at said wavelength $\lambda$ through said wall.

15. The electrochemical device of claim 14, wherein, furthermore, said optical device for imaging in reflection is suitable for illuminating said layer at at least one wavelength $\lambda$ minimizing reflectivity in correspondence with said first minimum, with a tolerance of plus or minus 10% with respect to said first reflectivity minimum.

16. The electrochemical device of claim 1, also comprising an optical projecting device arranged to project a light pattern onto said layer through said wall.

17. A method for studying an electrochemical reaction in situ, comprising the following steps:

providing an electrochemical device comprising a fluidic cell having an internal volume able to be filled with a fluid and at least one first and one second electrode making contact with said internal volume, wherein at least said first electrode comprises a layer made of a conductive material that is optically absorbent at at least one wavelength $\lambda$ in the visible, near-infrared or near-ultraviolet spectrum, said layer being arranged on or in an internal surface of a wall of said fluidic cell which is at least partially transparent to said wavelength $\lambda$, and wherein said wall forms, with said layer, a window having, at said wavelength $\lambda$, a transmittance higher than or equal to 30%, the device further comprising an optical device for imaging in reflection, which is arranged to illuminate said layer through said wall at at least said wavelength $\lambda$ and also to observe it through said wall;

applying a potential difference between two electrodes of the electrochemical device, a fluid capable of initiating an electrochemical reaction being contained in said internal volume, and thereby causing a said electrochemical reaction to occur on the surface of said first electrode; and illuminating and observing said first electrode through said wall by means of said optical imaging device.

18. An electrochemical printing process comprising the following steps:

providing an electrochemical device comprising a fluidic cell having an internal volume able to be filled with a fluid and at least one first and one second electrode making contact with said internal volume, wherein at least said first electrode comprises a layer made of a conductive material that is optically absorbent at at least one wavelength $\lambda$ in the visible, near-infrared or near-ultraviolet spectrum, said layer being arranged on or in an internal surface of a wall of said fluidic cell which is at least partially transparent to said wavelength $\lambda$, and wherein said wall forms, with said layer, a window having, at said wavelength $\lambda$, a transmittance higher than or equal to 30%, the device further comprising an optical device for imaging in reflection, which is arranged to illuminate said layer through said wall at at least said wavelength $\lambda$ and also to observe it through said wall and an optical projecting device arranged to project a light pattern onto said layer through said wall;

applying a potential difference between said first and said second electrode of the electrochemical device, a fluid capable of initiating a photo-electrochemical deposition reaction being contained in said internal volume;

simultaneously, projecting a light pattern onto said layer through said wall by means of said optical projecting device and thereby causing a photo-electrochemical deposition reaction to occur on the surface of said first electrode, which reaction is controlled by the local illumination of said surface by said light pattern; and observing said first electrode through said wall by means of said optical imaging device.

19. The electrochemical printing process of claim 18, wherein said optical projecting device is used to project onto said layer a light pattern corresponding to a first wavelength or to a first set of wavelengths and wherein said optical imaging device is used to illuminate said layer at at least said wavelength $\lambda$, which wavelength is different from said first wavelength or does not belong to said first set of wavelengths.

* * * * *